No. 620,797. Patented Mar. 7, 1899.
N. K. PEOPLES.
BICYCLE DRIVING GEAR.
(Application filed May 25, 1897.)
(No Model.) 3 Sheets—Sheet 1.
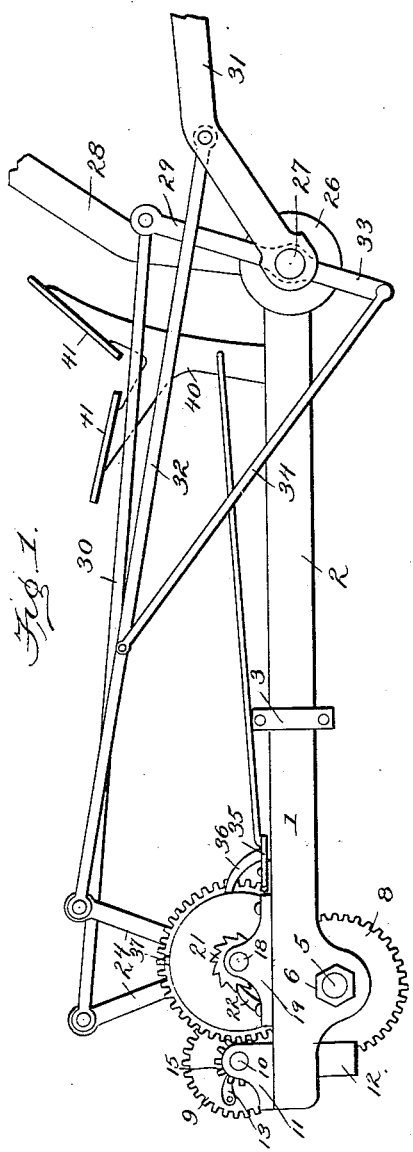
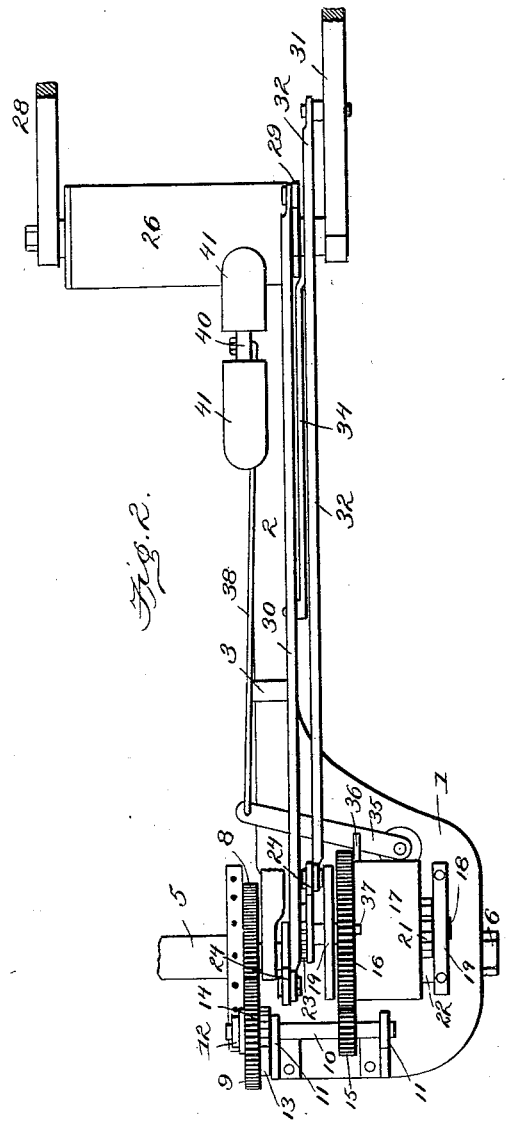
WITNESSES:
Edwin L Bradford
Victor J. Evans
INVENTOR
N. K. Peoples
BY
John Wedderburn
ATTORNEY.

No. 620,797. Patented Mar. 7, 1899.
N. K. PEOPLES.
BICYCLE DRIVING GEAR.
(Application filed May 25, 1897.)
(No Model.) 3 Sheets—Sheet 2.
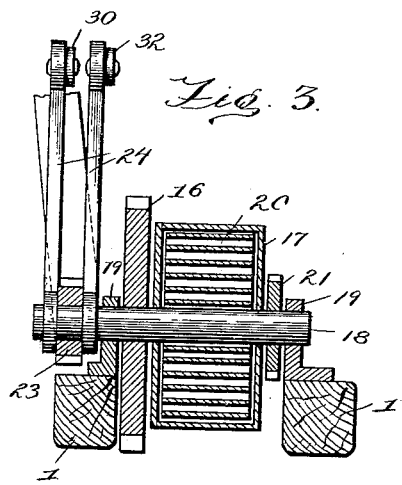
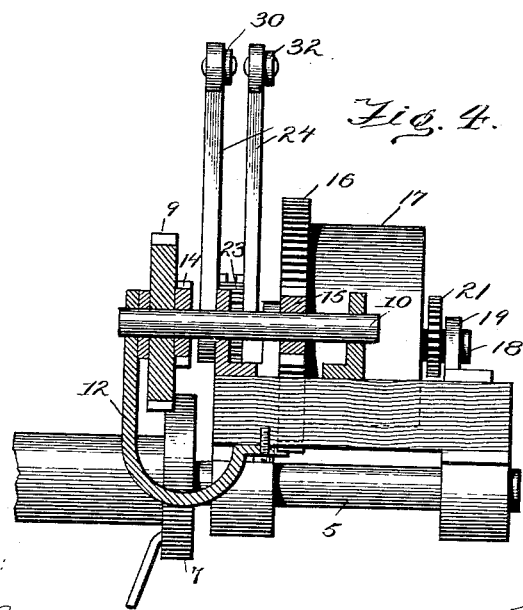
WITNESSES:
Edwin L. Bradford
Victor J. Evans
INVENTOR
N. K. Peoples
BY
John Wedderburn
ATTORNEY.

No. 620,797. Patented Mar. 7, 1899.
N. K. PEOPLES.
BICYCLE DRIVING GEAR.
(Application filed May 25, 1897.)
(No Model.) 3 Sheets—Sheet 3.
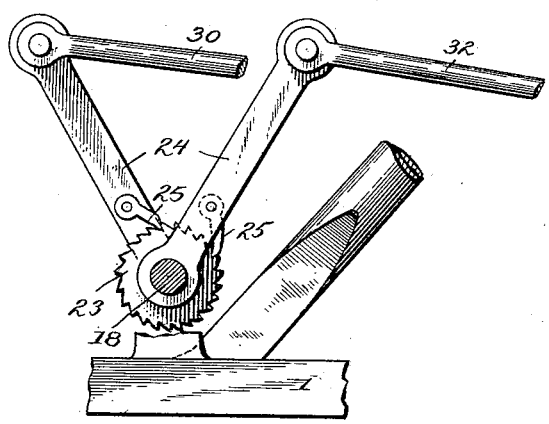
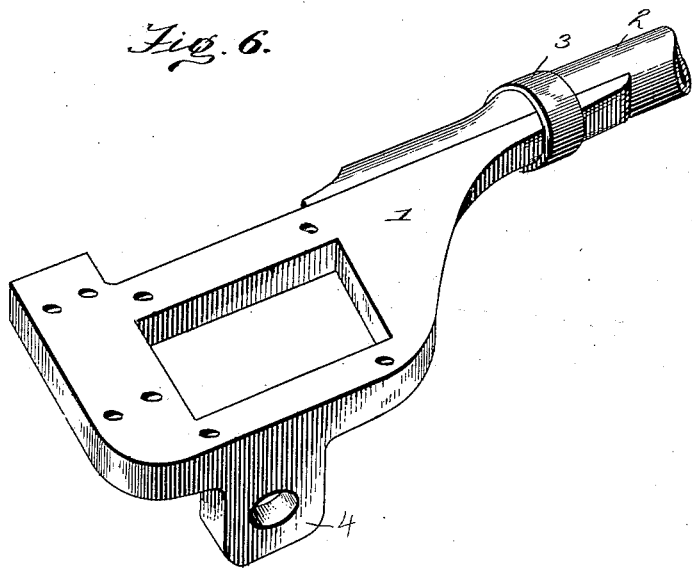
WITNESSES:
Edwin L. Bradford
Victor J. Evans
INVENTOR
N. K. Peoples
BY
John Wedderburn.
ATTORNEY.
THE NORRIS PETERS CO., PHOTO-LITHO., WASHINGTON, D. C.

UNITED STATES PATENT OFFICE.

NER K. PEOPLES, OF WATSON, MISSOURI.

BICYCLE DRIVING-GEAR.

SPECIFICATION forming part of Letters Patent No. 620,797, dated March 7, 1899.

Application filed May 25, 1897. Serial No. 638,084. (No model.)

*To all whom it may concern:*

Be it known that I, NER K. PEOPLES, of Watson, in the county of Atchison and State of Missouri, have invented certain new and useful Improvements in Bicycle Driving-Gears; and I do hereby declare the following to be a full, clear, and exact description of the invention, such as will enable others skilled in the art to which it appertains to make and use the same.

This invention relates to bicycle driving-gear, and has for its object to dispense with the usual sprocket-wheels and drive-chain and the friction and other disadvantages incident to the use thereof and to provide in lieu thereof simple and effective driving mechanism for transmitting the power of the rider to the driving-wheel of the machine, the mechanism being adapted to enable the maximum power and speed to be obtained with the least amount of exertion on the part of the rider.

The detailed objects and advantages of the invention will be pointed out in the course of the subjoined description.

The invention consists in improved bicycle driving-gear embodying certain novel features and details of construction and relative disposition of parts, as hereinafter fully described, illustrated in the drawings, and incorporated in the claims hereto appended.

In the accompanying drawings, Figure 1 is a side elevation of a sufficient portion of a bicycle to illustrate the application of the present improvement thereto. Fig. 2 is a plan view thereof. Fig. 3 is a detail view, in vertical section, taken through the drum 17, showing the shaft 18 and the arms 24 in full lines. Fig. 4 is a transverse section taken in the direction of the length of the motor-shaft and showing both the motor-shaft and the spring-drum in elevation. Fig. 5 is a detail view in end elevation, showing the ratchet-wheel, detents, arms 24, and the pitman-rods or connecting-rods 30 and 32. Fig. 6 is a detail view of the frame, bottom run, and collar, designed to be attached to the machine-frame.

Similar numerals of reference designate corresponding parts in all the views.

The improved driving-gear contemplated in this invention may be either manufactured with the machine and form, primarily, a part thereof or it may be manufactured separately in the form of an attachment which is capable of being applied to an ordinary safety-bicycle of modern construction, it only being necessary to remove the usual sprocket wheels and chain and substitute the improved driving-gear therefor. The improved driving mechanism will be described as applicable in the form of an attachment.

Referring to the drawings, 1 designates the frame of the attachment, which is secured to one of the bottom runs 2 of the machine-frame adjacent to the axle of the rear or driving wheel. The forward portion of the frame 1 is extended longitudinally of the bottom run and is shaped to partially embrace said bottom run for securing a snug fit, the frame being secured to the bottom run by means of a band 3, embracing both of said parts, as shown.

The frame is provided with an ear or bracket 4 for the reception of the axle 5 of the driving-wheel, said axle being inserted through the opening in said bracket and receiving a nut 6, whereby the attachment is secured firmly to the bicycle.

Secured to the hub of the driving-wheel 7 is a spur gear-wheel 8, and meshing with said wheel is a similar gear-wheel 9, which is mounted loosely upon a counter-shaft 10, extending parallel to the motor-shaft, hereinafter described. The shaft 10 is mounted in bearings or boxes 11, secured to the upper side of the frame 1 at spaced points and is further supported at its extreme inner end by means of a U-shaped metal bracket 12, which is secured to the under side of the frame 1. The wheel 9 rotates loosely on the shaft 10, but is provided with a dog 13, which engages a ratchet-wheel 14-fast on the shaft 10, so that when the counter shaft is rotated in a backward direction the ratchet-wheel 14 will engage the dog 13 and cause a backward rotation of the wheel 9, thus imparting a forward rotation to the wheel 8, and consequently the driving-wheel of the machine. Mounted fast upon the shaft 10 is a spur-pinion 15, which meshes with a spur gear-wheel 16, fast on shaft 18 and made in the form of a toothed rim arranged at the inner edge of and extending circumferentially beyond a hollow drum 17.

The drum 17 is mounted revolubly and loosely upon the motor-shaft 18, and said shaft is mounted at spaced points in suitable bearings or boxes 19, carried on the frame 1. Within the drum 17 is arranged a coil-spring 20 of any desired strength, the same being coiled in volute form around the shaft 18 and having one end connected to said shaft and its opposite end connected to the interior of the drum 17. At its outer end the shaft 18 is provided with a ratchet-disk 21, which is fast thereon and which is engaged by a detent 22 for preventing retrograde movement of the shaft 18, the detent being pivotally connected to the frame 1 or to the adjacent bearing-box 19.

At its opposite end the shaft 18 has fast thereon a spur-gear or ratchet-wheel 23, to which motion is imparted for winding the spring within the drum 17, and thus imparting motion to the drum, thence to the counter-shaft 10, and finally to the driving-wheel of the machine for propelling the latter at greatly-increased speed.

24 designates a pair of arms, which are fulcrumed on the motor-shaft 18 and which carry pivoted dogs 25, which engage the ratchet-wheel 23 for imparting a forward rotation thereto. The arms 24 are arranged on opposite sides of the wheel 23, and the dogs 25 are secured to the inner sides of said arms, so as to engage the wheel 23 without interfering with each other, the dogs being adapted to alternately engage and turn said wheel.

Extending through and journaled in the crank-hanger 26 is an axle 27, having fast at one end thereof a pedal-lever 28, to which one of the pedals is secured. At the opposite end of the axle 27 is a crank 29, which is fast on said axle and from the outer end of which a connecting-rod or pitman 30 extends upward to and connects pivotally with one of the arms 24, above referred to. Mounted loosely upon the opposite end of the shaft 27 from the pedal-lever 28 is a second pedal-lever 31, and connected to said lever at a suitable point is a pitman or connecting-rod 32, which extends back and connects pivotally to the other arm 24. The crank 29 is extended beyond or on the opposite side of the axle 27 to form another and shorter crank 33, and from this crank a rod 34 extends upward and connects pivotally to the rod or pitman 32 at a point intermediate the ends of the latter. By means of the construction just described it will be seen that as one pedal-lever is depressed the other pedal-lever is correspondingly elevated, and the levers are thus alternately vibrated without the use of springs, which would effect a loss of power.

Pivotally connected to one bearing or box 19 on the frame 1 is a horizontal brake-beam 35, which is pivoted at its outer end and has at an intermediate point a lip or catch 36, which is adapted to move into and out of the path of one or more radial projections 37 on the periphery of the drum 17 for causing a stoppage of the latter and saving the power of the spring for use at a subsequent time. The brake-beam 35 has pivotally attached to its inner end a link or rod 38, which extends forward and connects pivotally with the foot-lever 40, fulcrumed on the machine-frame adjacent to the crank-hanger 26 and provided with one or more treadles or foot-rests 41, by means of which the brake-beam 35 may be moved toward and away from the drum 17 for the purpose specified. When the drum 17 is stopped by the brake just described, the dog 13 will slip by the teeth of the ratchet-wheel on the counter-shaft 10, thus allowing the wheel 9 to turn freely on its shaft without actuating any other parts of the driving mechanism, such being the position of the parts while coasting and when the driving mechanism is not needed in use.

From the foregoing description it will be seen that a very simple and reliable driving mechanism is provided for bicycles and other foot-propelled vehicles, that the objectionable sprocket-wheels and driving-chains are entirely dispensed with, that the pedal-levers are alternately vibrated in opposite directions, and that the driving mechanism may be thrown into and out of action with ease by the rider while in the saddle. It will of course be understood that the driving mechanism above described and the several parts thereof are susceptible of change in the form, proportion, and minor details of construction, which may accordingly be resorted to without departing from the principle or sacrificing any of the advantages of the invention.

Having thus described the invention, what is claimed as new, and desired to be secured by Letters Patent, is—

1. In bicycle driving-gear, the combination with a driving-wheel of the machine, of a pedal-shaft, a pair of pedal-levers mounted one fast and the other loose thereon, a pair of connecting-rods extending from said pedal-levers back and operatively geared to the driving-wheel, and means whereby said pedal-levers are caused to vibrate alternately, substantially as described.

2. In a bicycle, the combination with the driving-wheel thereof, of a pedal-shaft, a pedal-lever fast thereon, a pedal-lever loose thereon, a crank-arm fast on said shaft, connecting-rods extending from the loose lever and the crank-arm back and operatively geared to the driving-wheel, and a link or rod interposed between one of said connecting-rods and the crank on the pedal-shaft, substantially as described.

3. In a bicycle, the combination with the driving-wheel of the machine and gearing for imparting motion thereto, of a pedal-shaft, a pedal fast thereon, a pedal loose thereon, a pair of cranks fast on said shaft and extending substantially in opposite directions, a connecting-rod between said loose-pedal lever and the driving-gear, a second connecting-rod interposed between one of said cranks and the driving-gear, and a rod or link interposed between the second crank and the connecting-rod which engages with the other crank, substantially as described.

4. The combination with a bicycle, of a spring-actuated drum arranged at one side thereof, means for winding the spring within said drum, a brake-beam adjacent to the periphery of said drum and adapted to engage with one or more radial projections on the periphery of the drum, a foot-lever, and a connection between said foot-lever and brake-beam, substantially as described.

5. The combination with a bicycle, of a spring-actuated drum arranged at one side of the driving-wheel and geared thereto, a spring arranged within said drum, means for winding said spring, a brake-beam, a catch carried by said beam, a projection on the periphery of said drum, and a foot-lever connected with said brake-beam for moving the catch thereof into and out of the path of the projection on the drum, substantially as and for the purpose described.

In testimony whereof I have signed this specification in the presence of two subscribing witnesses.

NER K. PEOPLES.

Witnesses:
PATRICK HAYS,
A. W. MONTGOMERY.